US005777997A

United States Patent [19]

Kahn et al.

[11] Patent Number: 5,777,997

[45] Date of Patent: Jul. 7, 1998

[54] METHOD AND SYSTEM FOR TRANSMITTING AUDIO-ASSOCIATED TEXT INFORMATION IN A MULTIPLEXED TRANSMISSION STREAM

[75] Inventors: Raynold Kahn, Los Angeles; Alan Lopez, Torrance, both of Calif.

[73] Assignee: Hughes Electronics Corporation, El Segundo, Calif.

[21] Appl. No.: 612,133

[22] Filed: Mar. 7, 1996

[51] Int. Cl.[6] .......... H04J 1/02

[52] U.S. Cl. .......... 370/493; 370/524

[58] Field of Search .......... 370/493–495, 370/522–529

[56] References Cited

U.S. PATENT DOCUMENTS

| | | | |
|---|---|---|---|
| 4,887,308 | 12/1989 | Dutton | 455/456 |
| 5,282,028 | 1/1994 | Johnson | 358/86 |
| 5,561,849 | 10/1996 | Mankovitz | 370/527 |
| 5,583,873 | 12/1996 | Miyake | 370/527 |
| 5,675,575 | 10/1997 | Wall | 370/326 |

*Primary Examiner*—Douglas W. Olms
*Assistant Examiner*—Matthew C. Phillips
*Attorney, Agent, or Firm*—Hughes Electronics Corporation

[57] ABSTRACT

A method and system for transmitting audio-associated text information in a multiple-channel transmission stream is disclosed herein. The method includes the steps of receiving text information associated with a song, formatting the information into song data, inserting the song data into a control data stream associated with an audio channel carrying a particular song, multiplexing the control data stream with a data stream associated with the song, transmitting the multiplexed data stream, receiving the control data stream, decoding the control data stream to obtain text associated with the song, and displaying the text. The method utilizes an existing control stream in the multiplexed transmission stream to forward text to a receiver. The receiver therefore requires no additional hardware to display the text on a connected video screen.

12 Claims, 4 Drawing Sheets

METHOD AND SYSTEM FOR TRANSMITTING AUDIO-ASSOCIATED TEXT INFORMATION IN A MULTIPLEXED TRANSMISSION STREAM

BACKGROUND OF THE INVENTION

The present invention relates generally to satellite communication systems, and more particularly to a method and system for transmitting audio-associated text information, such as song information, in a multiplexed transmission stream.

Advances in video and audio compression technology, in integrated circuit technology, and in the communications infrastructure have resulted in a new broadcast format for efficient delivery of high quality video and audio programming to consumers, as well as the delivery of useful data services. In particular, the advent of high-power communication satellites in combination with this new broadcast format have allowed for the delivery of over 100 channels of digital video to be transmitted directly to a viewer's home.

For example, digital video information may be transmitted in identifiable groups of bytes or packets. The digital video byte stream is divided up and packaged into fixed-length packets. The packets from several different video sources can be rapidly assembled together (i.e., multiplexed) onto a single carrier frequency.

Generally, in modern digital satellite communication systems such as Direct Broadcast Satellite ("DBS") systems, a ground-based transmitter beams the packets in a multiplexed stream to a satellite positioned in a geosynchronous orbit. The satellite in turn relays the stream back to a ground-based receiver antenna. A household subscribing to the system receives the broadcast signals through a receiver unit and a satellite dish antenna. In a DBS system, the satellite receiver antenna includes an 18-inch parabolic dish, and the receiver unit is a television set-top integrated receiver/decoder module, or "IRD". The receiver antenna is mounted outside a subscriber's home, and cables are provided to link the antenna to the indoor IRD and television.

More recently, audio channels on the satellite bandwidth have been utilized to transmit near compact-disc quality digital audio programming to subscribers of the satellite systems without accompanying video. Similar to broadcast radio, these "audio-only" programs allow the user to receive the programming using only the existing IRD and speakers, without the need for any supplemental receiving or decoding equipment.

Audio-only programming has previously been available from terrestrial broadcast services, such as cable providers. However, such systems required a proprietary remote control unit and a separate set-top decoder box for decoding the broadcasts. These systems also provided a useful alphanumeric readout on the remote control unit which allowed the user to view the title and artist of the current song or program playing on a particular channel. This text information is currently available only to the terrestrial cable audio-only system subscribers.

SUMMARY OF THE INVENTION

The invention as herein described is a method and system of transmitting text information in a multiplexed stream. The method includes the steps of receiving text information associated with a song, formatting the information into song data, inserting the song data into a control data stream associated with an audio channel carrying a particular song, multiplexing the control data stream with a data stream associated with the song's audio, transmitting the multiplexed stream, receiving the control data stream from the satellite, decoding the control data stream to obtain text associated with the song, and displaying the text.

In another aspect of the invention, a system for transmitting text information is provided that includes an information receiver that receives the text information from a service provider, an information computer that formats the text information into song data and inserts the song data into a control data stream, a multiplexer that multiplexes the control data stream and an audio stream into a single transmission stream, a modulator that modulates the transmission stream, a transmitter that transmits the transmission stream, a receiver that decodes and demodulates the transmission stream, and a video screen in communication with the receiver.

The preferred embodiment of the system and method allows the insertion of text information data into a control packet within the transmission stream for uplinking to a satellite on the same channel that contains a corresponding audio signal. The embodiment illustrated receives a sequence of messages from the control packets, and displays a sequence of two-line messages on a video screen connected to an IRD. This provides the user with an easily compatible and simplified method of obtaining song information while listening to an audio-only digital satellite broadcast.

It is to be understood that both the foregoing general description and the following detailed description are exemplary and explanatory and are intended to provide further explanation of the invention as claimed.

The invention, together with further objects and attendant advantages, will best be understood by reference to the following detailed description, taken in conjunction with the accompanying drawings.

DETAILED DESCRIPTION OF THE PREFERRED EMBODIMENTS

Figure 1:
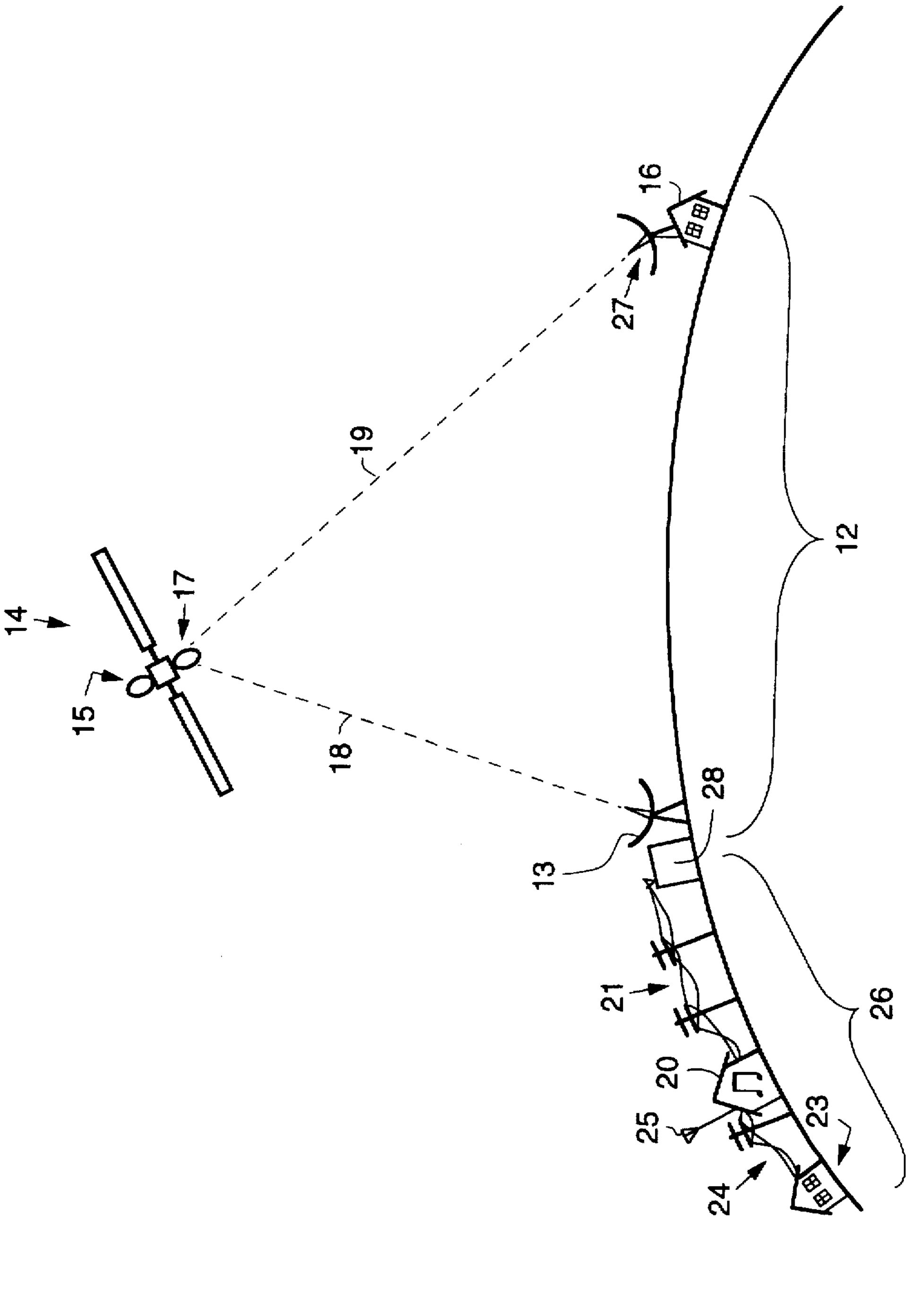
FIG. 1 illustrates a conventional direct-to-home DBS satellite television system and song information provider system capable of utilizing the present invention.

Referring now to the drawings, and more particularly to FIG. 1, a digital DBS system 12 capable of utilizing the present invention is illustrated. The DBS system 12 preferably includes a ground-based broadcast transmitter 13, a space segment 14 that includes a satellite 15, and a ground-based subscriber receiving station 16. In an exemplary DBS system, the satellite 15 is a geosynchronous satellite, such as the Hughes® HS-601™ spacecraft, positioned at a geosynchronous orbital location at approximately 101° W longitude. The home subscriber receiving station 16 includes an outdoor receiver dish antenna 27 connected to an indoor receiver/decoder box or IRD (not shown) via a cable (also not shown).

The broadcast transmitter 13 receives digitally modulated television or audio signals through an uplink facility 28. The uplink facility multiplexes a number of compressed video channels and audio channels along with control information onto a single, packetized data transmission stream. Packetizing breaks up the data streams into fixed-length blocks or packets. Multiplexing combines packets from the different data streams into a multiplexed packet transmission stream. The transmitter 13 then beams the multiplexed signals at 17.3–17.8 Ghz to the satellite 15 on an uplink 18. The satellite 15 translates the signals and beams them on a downlink 19 to the receiver dish antenna 27 of the home receiving station 16 for subsequent demodulation. The satellite 15 transmits downlink signals via on-board transponders 17 operating at a power level of 120 to 240 watts.

Also shown in FIG. 1 is a conventional terrestrial music provider system 26. Music provider source 20, which can be a presently available cable audio-only service provider, generates audio programming signals, such as a song, on an audio channel and song information, such as title text, artist name, or producer name relating to the particular song being broadcast on a particular channel. The song information is typically sent via a radio antenna 25 or cable 24 to subscriber households such as subscriber 23. Preferably, in accordance with the present invention, the song information can be sent via the transmission lines 21 or the antenna 25 to the transmitter uplink facility 28. The transmitter 13 subsequently transmits a data stream relating to the song information via the uplink 18 to the satellite 15.

The song information generated at provider source 20 can represent text or data relating to the song title, performing artist, the title of the compact disc or album which contains the song, and the record company which produced the compact disc or album. In order to allow subscribers to the system 26 to order their own music compact discs or albums, the song information can even contain a catalogue number of the compact disc or album and a telephone number which may be used to order the materials.

Figure 2:
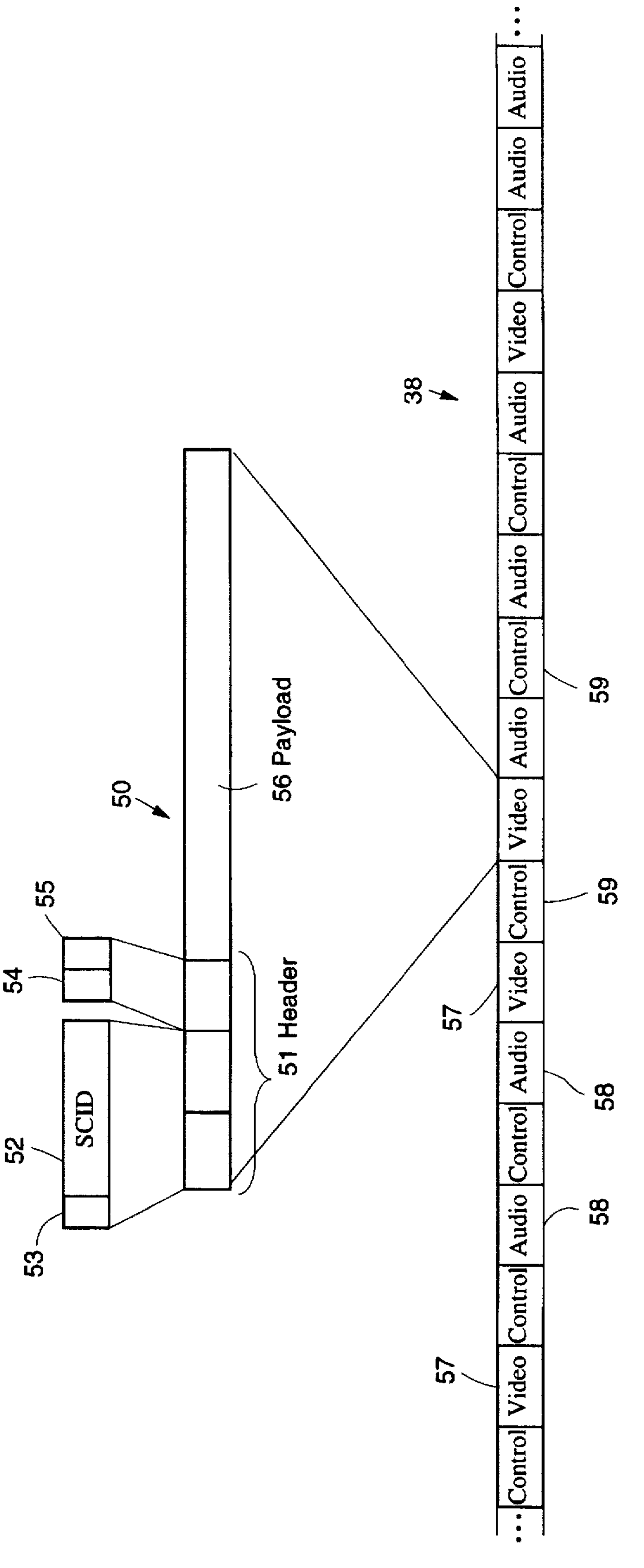
FIG. 2 illustrates an exemplary digital packet and the digital packet stream transmitted by the system of FIG. 1.

The processing of the signals received by the music provider source 20 occurs as follows. The digital video from other providers and audio signals from provider source 20 are routed to the uplink facility 28 for compression, encryption, and multiplexing with control data before transmission. The resulting digital data streams are compressed into approximately 3.5–7.5 Mbps digital compressed data stream using an MPEG-2 type compression scheme. Depending on the content, the MPEG-2 type compression allows a possible 36:1 to 70:1 data compression. The compressed signal is then encrypted to prevent unauthorized access to the signal. Audio signals are similarly compressed but not ordinarily encrypted. The processed video and audio data streams are packetized and multiplexed along with a number of network control data streams into a single group of packets, or a transmission stream. Control information is usually not encrypted. The stream is then provided with forward error correction (FEC) to correct transmission errors at the receiver As shown in FIG. 2, the multiplexed data transmission stream 38 contains data in groups of bytes or packets 50. In a preferred embodiment, each fixed-length packet 50 contains over 100 bytes of eight bits per byte. The first several bytes of a packet 50 preferably comprise a packet header 51. These first bytes contain information identifying the packet type and an address identifying the specific service being carried by the packet. All packets with a single channel, including the control packets, utilize the same address or service channel ID ("SCID"). The header 51 contains information which aids in packet framing, indicates whether or not the packet is encrypted, contains a continuity counter which increments for successive packets with the same service channel ID, and identifies the type of service being carried by the packet (video, audio, data or control).

The remaining bytes of the packet 50 comprise the data or the payload 56 of the packet 50. The payload bytes 56 can contain any type of information. Preferably, payload 56 contains user services (video, audio, or data) or system control information. For example, in a typical audio-only channel, the payload 56 may contain digitally encoded audio data 58 sampled at a 48 KHz rate, or the 44.1 KHz sampled compact digital disc format. In addition, a number of bytes (not shown) may be added to packet 50 for forward error-correction. Preferably two packet stream data rates are used, 30.3 Mbps or 23.6 Mbps.

The payload 56 can also carry system control information for the payload in control packet 59. The control information is normally used to provide status messages to viewers of video programming, in addition to encryption and pay-per-view information.

With the multiplexed packet scheme, a 30.3 Mbps packet stream 38 is capable of carrying up to four television channels or up to eight recorded film channels, several audio channels and system control information. Up to 32 (or more) packet streams with different programming information are assembled to deliver over 100 channels of video and/or audio. Each of the 32 packet streams has a program guide or Master Program Guide (MPG) which identifies the different video 57, audio 58, and control stream packets 59 present in the packet stream. The MPG lists the available channels by SCID and the programming associated with each SCID. The MPG also contains system information such as network configuration data and other system parameters. The MPG is sent periodically, preferably every second.

Each of the 32 packet streams 38 are quadrature phase shift key (QPSK) modulated onto a carrier frequency with a symbol rate of 20 Mega symbols/sec, to provide a total bit rate of 40 Mbps. The 40 Mbps carrier is upconverted in frequency to one of 32 assigned uplink frequencies between 17.3 to 17.8 GHz before being uplinked to satellite 15.

Typical DBS systems transmit individual broadcasts, known as programs, which a DBS subscriber can potentially view. Each program carries a combination of attributes which restrict the program's potential audience. These attributes include information regarding the services to which the program belongs (such as a movie channel), a movie rating, pay-per-view price, and subscriber blackout regions. The program attributes together make up Program Associated Data ("PAD"), which is transmitted in the payload 56 of control packets 59. A control packet for each program is compiled using PAD.

Figure 3:
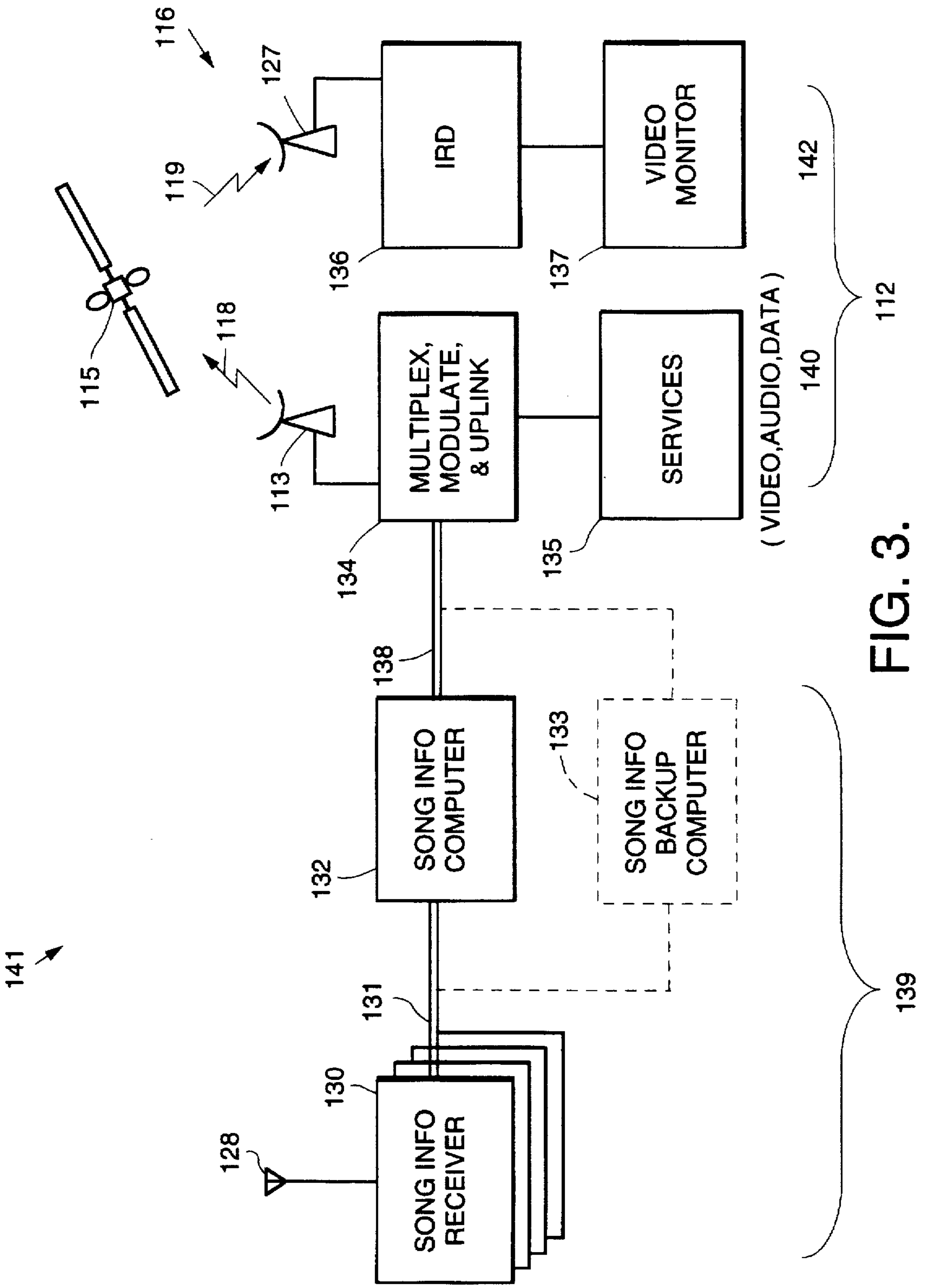
FIG. 3 illustrates the components of a song information transmitting and receiving system embodying the present invention.

FIG. 3 illustrates the components of a song information transmitting and receiving system 141 for a particular single channel embodying the present invention. System 141 includes a song information processing subsystem 139 and an existing satellite transmission system 112, such as that shown as 12 in FIG. 1. The song information processing subsystem 139 includes a song information receiver 130 connected to receiving antenna 128 and a series of song information computers 132 and 133 linked to the receiver 130 via line 131. The song information computer 132 is preferably utilized full-time, and computer 133 is mainly intended as a backup computer bridged around computer 132. The song information computers 132 and 133 may be any microprocessor-based system known in the art which can manipulate the digital song information data received in the receiver 130.

Link 138 connects the subsystem 139 to the satellite system 112, which includes on the transmit side 140 a conventional multiplexer, modulator, and uplink hardware as represented by transmission hardware block 134. Video, audio, and other data for broadcasting over the system 112 is supplied at 135 by various providers. Preferably, the song information received at the song information receiver 130 is representative of audio-only services provided at 135, and is supplied by the same provider of those services. The transmit side 140 transmits via an uplink 118 to satellite 115. On the receive side 142, the downlink 119 is received by an antenna 127 connected to IRD 136. The IRD 136 is in turn linked to a video monitor 137, such as a conventional television set.

The system 141 receives song information at receiver 130 which corresponds to a particular song being supplied at 135 to the transmission hardware 134 for uplink to the satellite 115. The song preferably consists of an audio signal, and is transmitted using conventional packet techniques which include control packets 59 incorporating PAD in the control payload 56 as described above. The received song information is forwarded via link 131 to the song information computer 132, which translates the song information format into PAD format and inserts the resulting data bits into a control packet. The modified packet is inserted into the transmission data stream 138 for transmission on uplink 118 in satellite system 112. The downlink 119 is received by the receiver 116 and demodulated and decoded by IRD 136. The song information data incorporated into the control packet of the transmission data stream 138 is automatically read along with the audio data, and the song information is displayed on video monitor 137 as a multi-line display.

Figure 4:
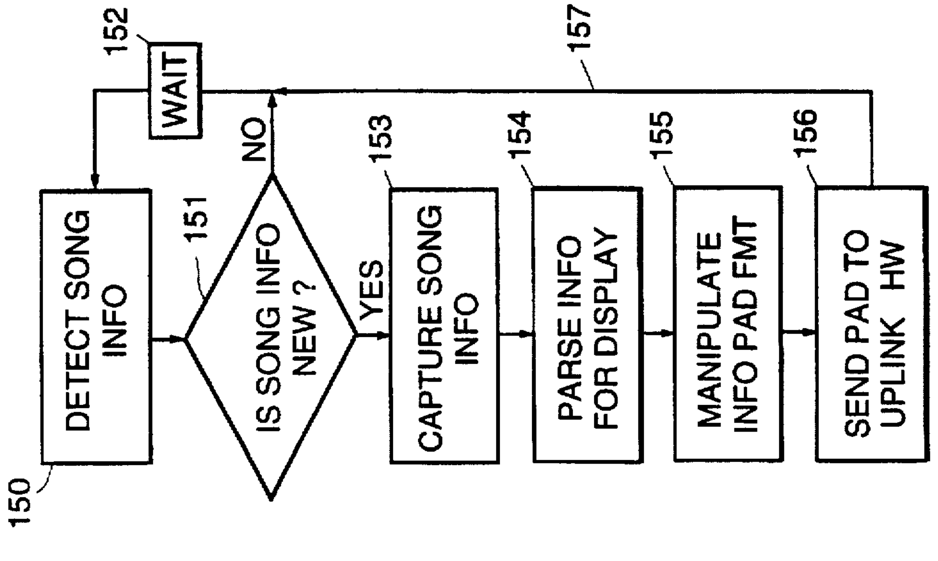
FIG. 4 is a flow diagram illustrating a method of transmitting audio-associated text information embodying the present invention.

The detailed operation of the song information processing subsystem 139 is shown in the flow diagram of FIG. 4. As shown in the Figure, the song information receiver 130 detects the song information from a music provider at block 150. If the detected song information is not new or has not changed at block 151, the receiver waits at block 152 until it detects the song information again at 151. If the detected song information has changed or is new, for example if the broadcast song audio from the provider has changed to a different song, the song information is captured at block 153 by the receiver 130. The song information computer 132 next parses the song information at block 151 to select only the information that is desired for display on a video monitor, for example the data representing the song title and song performer text. At block 155, the computer 132 inserts header and footer information around the song information data to manipulate the data into a PAD format for a control packet 59.

Preferably, within the control packet 59 for an audio-only system, the header and footer information defines routing information, which indicates the appropriate satellite transponder for transmission and the viewer channel on which the song information will appear; video display condition controls, which determine under what conditions the song information will be displayed; video display priority, which determines whether the song information will be displayed before or after any control text; video display duration; and video display controls, which determine how long the song information text will be displayed on the video screen. Preferably, the song information is always displayed on an audio-only channel.

The PAD is then routed via line 138 to the multiplexer, modulator, and uplink hardware 134 for transmission with the packet to the satellite 115. This step is represented by block 156 and proceeds as previously described. The system then returns at 157 to the information detect state at block 150 to wait for new song information from the provider.

The receiver 116 demodulates and decodes the packets in the transmission stream to retrieve the audio song broadcast on a particular channel. The song information is read from a control packet portion of the stream and displayed on an otherwise blank video monitor 137, such as a conventional television set. Preferably, when the particular song on the audio channel changes, the on-screen text changes due to detection of the song information change at block 150.

Figure 5:
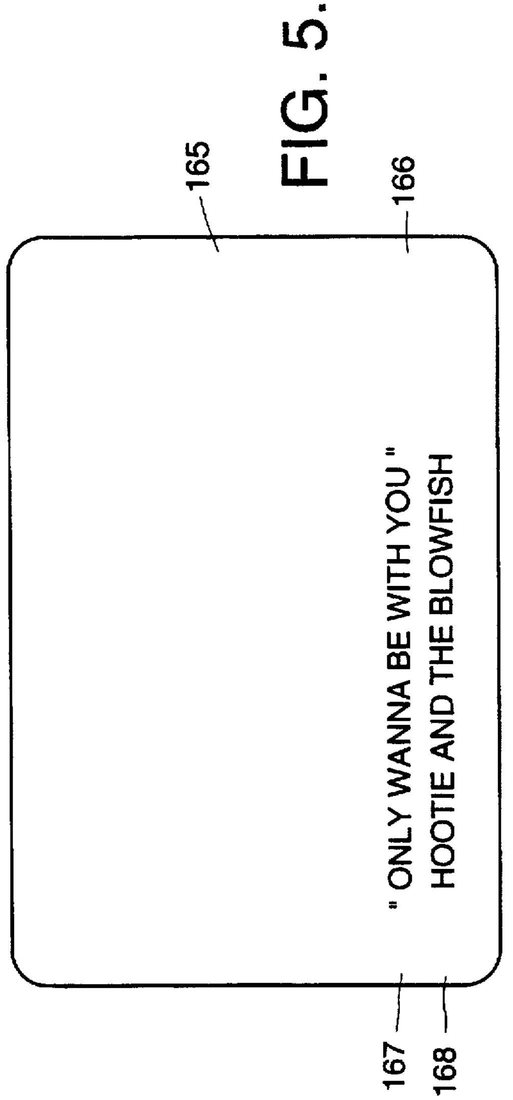
FIG. 5 illustrates a video screen display embodying the present invention.
Figure 6:
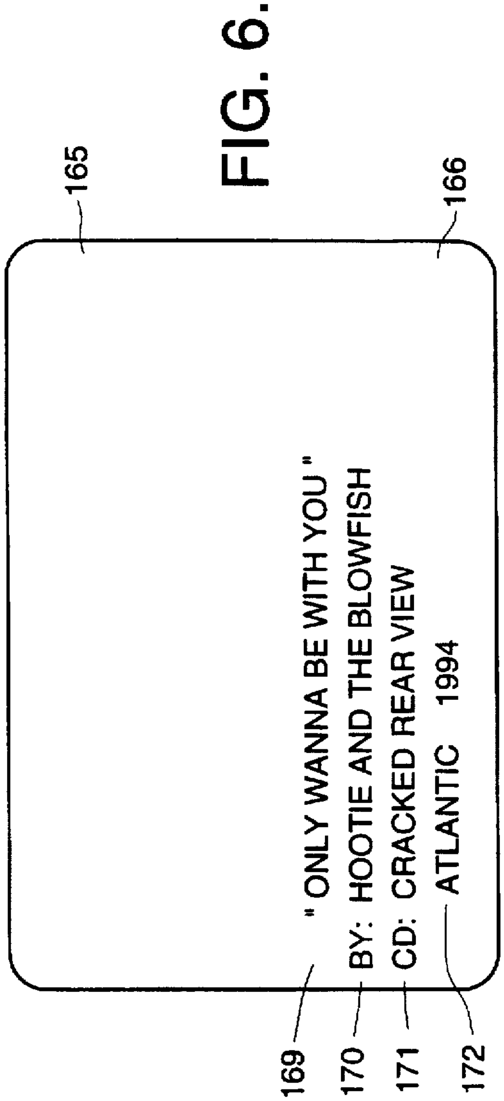
FIG. 6 illustrates an alternative embodiment of the screen display of FIG. 5.

FIGS. 5 and 6 illustrate preferred screen displays for the above-described embodiment. As shown in FIG. 5, the demodulated and decoded control packet information causes the IRD to display a two-line text graphic using techniques known by one skilled in the art on lower half 166 of video screen 165. Specifically, text line 167 shows a song title, and text line 168 shows a performing artist of the song being aired. In the alternative, as shown in FIG. 6, a four-line display may be shown with song title in first text line 169, performer in text line 170, album or compact disc name in text line 171, and publisher and year in text line 172. Of course, for a larger text display, such as four lines or up to the whole screen, the song information received from the song information provider must be parsed into the appropriate larger format.

The above-described system has many advantages over cable-provided music systems. For example, because the song information text received from the service provider is transmitted to the subscriber's IRD in an existing control data stream associated with the audio channel, no additional information-receiving hardware on the receiver side is necessary. Furthermore, no additional transponder capacity is required because the system shares bandwidth with the control data stream which is associated with the audio channel.

The preferred embodiment also has the advantage of backward compatibility, in that most receiver designs must read control packets in order to process the multiplexed audio or video signal. Thus, including the song information text in the control packet payload provides a convenient method of supplying text information to receiver stations.

Of course, it should be understood that a wide range of changes and modifications can be made to the preferred embodiments described above. For example, information other than song data may be transmitted through the control packet and displayed, such as information relating to programming changes or sets of songs. Furthermore, other types of displays may be used to display the transmitted song information, such as LCD or LED readouts added to the satellite subscriber's IRD units. Thus, it is intended that the foregoing detailed description be regarded as illustrative rather than limiting and that it be understood that it is the following claims, including all equivalents, which are intended to define the scope of this invention.

What is claimed is:

1. A method of transmitting text information associated with individual songs transmitted via a multiple-channel audio/video transmission network, said method comprising:

receiving text information associated with a first song;

formatting said text information into song data;

inserting said song data into a control data stream associated with an audio-only channel carrying said first song;

multiplexing said control data stream with a data stream associated with said audio-only channel and a video data stream associated with a video channel to form a multiplexed data stream;

transmitting said multiplexed data stream;

receiving said multiplexed data stream;

decoding said multiplexed data stream with a decoder to obtain text associated with said text information; and displaying said text in association with output of the audio of said song.

2. The method of claim 1 wherein the step of displaying said text further comprises formatting said text and producing said formatted text on a video screen.

3. The method of claim 1 wherein said text information relates to the title of a song carried in said audio signal on said audio channel.

4. The method of claim 1 wherein said text information relates to the artist performing the song carried in said audio signal on said audio channel.

5. The method of claim 4 further comprising the steps of:

changing the audio signal carried on said audio channel to represent a second song; and receiving updated text information associated with said second song.

6. The method of claim 1 wherein said control data stream does not include data from said audio signal.

7. A method of transmitting text information associated with individual songs transmitted via a multiple-channel audio/video transmission network, said method comprising:

receiving text information associated with a first song;

formatting said text information into song data;

inserting said song data into a control data stream associated with an audio channel carrying said first song;

multiplexing said control data stream with a data stream associated with said audio channel and a video data stream associated with a video channel to form a multiplexed data stream;

transmitting said multiplexed data stream;

receiving said multiplexed data stream;

decoding said multiplexed data stream to obtain text associated with said text information; and displaying said text in association with output of the audio of said song, wherein said control data stream contains information relating to routing of said multiplexed data stream, conditions for displaying said text, priority for displaying said text, and duration of the display of said text.

8. The method of claim 7 wherein said step of inserting said song data into a control data stream associated with an audio channel further comprises the substeps of:

parsing selected portions of said song data; and inserting bits around said song data to define routing of said multiplexed data stream, conditions for displaying said text, priority for displaying said text, and the duration of the display of said text.

9. A system for transmitting text information associated with individual songs transmitted via a multiple-channel audio/video transmission network, said system comprising:

an information receiver that receives said text information;

an information computer in communication with said information receiver, said computer formatting said text information into song data and inserting said song data into a control data stream;

a multiplexer in communication with said computer that multiplexes said control data stream, an audio stream, and at least one video stream into a multiplexed transmission stream;

a modulator that modulates said multiplexed transmission stream;

a transmitter that transmits said multiplexed transmission stream;

a receiver that decodes and demodulates said multiplexed transmission stream, said receiver capable of operating in accordance with commands in said control data stream; and a video screen in communication with said receiver capable of displaying received text.

10. A system for transmitting text information associated with individual songs transmitted via a multiple-channel audio/video transmission network, said system comprising:

an information receiver that receives said text information;

an information computer in communication with said information receiver, said computer formatting said text information into song data and inserting said song data into a control data stream;

a multiplexer in communication with said computer that multiplexes said control data stream, an audio stream, and at least one video stream into a multiplexed transmission stream;

a modulator that modulates said multiplexed transmission stream;

a transmitter that transmits said multiplexed transmission stream;

a receiver that decodes and demodulates said multiplexed transmission stream, said receiver capable of operating in accordance with commands in said control data stream; and a video screen in communication with said receiver capable of displaying received text, wherein said control data stream further comprises a control packet, and said transmission stream further comprises a packet stream.

11. The system of claim 10 wherein said text information further comprises information related to a song that is represented by said audio stream.

12. A method of transmitting text information associated with individual songs transmitted via a multiple-channel audio/video transmission network, said method comprising:

receiving text information associated with a first song;

formatting said text information into song data;

inserting said song data into a control data stream associated with the audio component of a channel carrying said first song;

multiplexing said control data stream with a data stream associated with said audio component of a channel and a video data stream associated with a video channel to form a multiplexed data stream;

transmitting said multiplexed data stream;

receiving said multiplexed data stream;

decoding said multiplexed data stream with a decoder to obtain text associated with said text information; and displaying said text in association with output of the audio of said song.

* * * * *